US012759568B2

(12) United States Patent
Kim

(10) Patent No.: US 12,759,568 B2
(45) Date of Patent: Oct. 13, 2026

(54) ELECTRONIC DEVICE AND METHOD FOR IDENTIFYING AN INDICATION OF ABNORMALITY

(71) Applicants: HYUNDAI MOTOR COMPANY, Seoul (KR); KIA CORPORATION, Seoul (KR)

(72) Inventor: Dae Hyun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 183 days.

(21) Appl. No.: 18/659,273

(22) Filed: May 9, 2024

(65) Prior Publication Data

US 2026/0014998 A1 Jan. 15, 2026

(30) Foreign Application Priority Data

Dec. 14, 2023 (KR) ........................ 10-2023-0182289

(51) Int. Cl.
*B60W 50/02* (2012.01)
*B60W 30/14* (2006.01)
(Continued)

(52) U.S. Cl.
CPC ...... *B60W 50/0205* (2013.01); *B60W 30/143* (2013.01); *B60W 50/029* (2013.01);
(Continued)

(58) Field of Classification Search
CPC ........... B60W 50/0205; B60W 50/029; B60W 50/14; B60W 30/143; B60W 60/001;
(Continued)

(56) References Cited

U.S. PATENT DOCUMENTS

2017/0169208 A1* 6/2017 Jantz ........................ G06F 21/44
2019/0001964 A1* 1/2019 Lin .......................... G05D 1/81
(Continued)

FOREIGN PATENT DOCUMENTS

KR 20230057512 A * 5/2023 ........... B62D 15/025
WO WO-2022112397 A1 * 6/2022 .......... G01M 17/007

OTHER PUBLICATIONS

El-Rewini et al.; Cybersecurity Attacks in Vehicular Sensors; IEEE Sensors Journal, vol. 20, No. 22, Nov. 15, 2020 (Year: 2020).*

*Primary Examiner* — Tara Schimpf
(74) *Attorney, Agent, or Firm* — Lempia Summerfield Katz LLC

(57) ABSTRACT

An electronic device includes a memory that stores computer-executable instructions and at least one processor that executes the instructions. The at least one processor receives command data related to autonomous driving of a vehicle from an autonomous driving module. The at least one processor identifies, based on reception of the command data, at least one of first measurement data corresponding to a lateral direction based on a movement direction of the vehicle and related to a movement of the vehicle and/or second measurement data corresponding to a longitudinal direction based on the movement direction of and related to the movement of the vehicle. The at least one processor identifies an indication of abnormality of the autonomous driving module based on at least one of map data including a high-definition map received from a map device, the command data, the first measurement data, and/or the second measurement data.

19 Claims, 8 Drawing Sheets

(51) Int. Cl.

| | |
|---|---|
| ***B60W 50/029*** | (2012.01) |
| ***B60W 50/14*** | (2020.01) |
| ***B60W 60/00*** | (2020.01) |
| ***H04L 9/08*** | (2006.01) |
| *B60W 50/00* | (2006.01) |

(52) U.S. Cl.

CPC .......... *B60W 50/14* (2013.01); *B60W 60/001* (2020.02); *H04L 9/0825* (2013.01); *H04L 9/0869* (2013.01); *B60W 2050/0083* (2013.01); *B60W 2050/0215* (2013.01); *B60W 2520/10* (2013.01); *B60W 2540/18* (2013.01); *B60W 2552/30* (2020.02); *B60W 2555/60* (2020.02); *B60W 2556/40* (2020.02); *B60W 2556/45* (2020.02); *H04L 2209/84* (2013.01)

(58) Field of Classification Search

CPC . B60W 2050/0083; B60W 2050/0215; B60W 2520/10; B60W 2540/18; B60W 2552/30; B60W 2555/60; B60W 2556/40; B60W 2556/45; H04L 9/0825; H04L 9/0869; H04L 2209/84

See application file for complete search history.

(56) References Cited

U.S. PATENT DOCUMENTS

2020/0031362 A1* 1/2020 Lee ........................ B60W 50/14
2024/0034351 A1* 2/2024 Lee ........................ B62D 6/001

* cited by examiner

ELECTRONIC DEVICE AND METHOD FOR IDENTIFYING AN INDICATION OF ABNORMALITY

CROSS-REFERENCE TO RELATED APPLICATION

This application claims the benefit of and priority to Korean Patent Application No. 10-2023-0182289, filed in the Korean Intellectual Property Office on Dec. 14, 2023, the entire contents of which are hereby incorporated herein by reference.

TECHNICAL FIELD

The present disclosure relates to an electronic device and a method for identifying an indication of abnormality. More specifically, the present disclosure relates to a technology for identifying an indication of abnormality of an autonomous driving module.

BACKGROUND

An autonomous (autonomous navigation) vehicle requires technologies in various fields to complete a given mission in a variety of environments. The most fundamental technology for an autonomous vehicle is an autonomous driving technology of autonomously traveling to a given destination via a safe, fast, and optimal route.

The autonomous driving technology of the autonomous vehicle is characterized by performing a reasonable setting of the route to the given destination offline, taking into account large-scale geographical characteristics and a mission risk based on pre-provided digital elevation map (DEM)/digital surface map (DSM) and feature data base (FDB) using a detection area of a sensor mounted on the autonomous vehicle.

However, on a general road where various variables exist, it is difficult for the autonomous vehicle to perform reliable driving on its own. To compensate for such problem, the vehicle must be equipped with an autonomous driving system or an autonomous driving module. However, the autonomous driving system or the autonomous driving module newly mounted in the vehicle may have a risk of being hacked from the outside.

SUMMARY

Therefore, to solve such problem, it is necessary to develop a technology to identify an indication of abnormality caused by the hacking of the autonomous driving system or the autonomous driving module newly mounted in the vehicle.

The present disclosure has been made to solve the above-mentioned problems occurring in the prior art while advantages achieved by the prior art are maintained intact.

Aspects of the present disclosure provide an electronic device and a method for identifying an indication of abnormality that may determine an indication of abnormality of a third-party autonomous driving module and reduce a possibility of malfunction of a vehicle by identifying command data received from the third-party autonomous driving module, first measurement data corresponding to a longitudinal direction, and second measurement data corresponding to a lateral direction.

Aspects of the present disclosure provide an electronic device and a method for identifying an indication of abnormality that may determine an error in command data of a third-party autonomous driving module and reduce a possibility of malfunction of a vehicle via a high-definition map required for autonomous driving of the vehicle by acquiring output data based on map data related to the high-definition map, the command data, first measurement data, and second measurement data.

Aspects of the present disclosure provide an electronic device and a method for identifying an indication of abnormality that may identify whether there is an error in a gateway as an internal system of a vehicle or a third-party autonomous driving module as an external system of the vehicle by transmitting and receiving an encrypted random number with the third-party autonomous driving module by referring to an abnormality indication log.

The technical problems to be solved by the present disclosure are not limited to the aforementioned problems. Other technical problems not mentioned herein should be clearly understood from the following description by those having ordinary skill in the art to which the present disclosure pertains.

According to an aspect of the present disclosure, an electronic device is provided. The electronic device includes a computer-executable instructions. The memory that stores electronic device also includes at least one processor configured to accesses the memory and execute the computer-executable instructions stored thereon. The at least one processor is configured to receive command data related to autonomous driving of a vehicle from an autonomous driving module. The at least one processor is also configured to identify, based on the reception of the command data, at least one of i) first measurement data corresponding to a lateral direction based on a movement direction of the vehicle and related to a movement of the vehicle or ii) second measurement data corresponding to a longitudinal direction based on the movement direction of the vehicle and related to the movement of the vehicle. The at least one processor is further configured to identify an indication of abnormality of the autonomous driving module based on at least one of map data including a high-definition map (HD map) received from a map device, the command data, the first measurement data, the second measurement data, or any combination thereof.

In one implementation, the at least one processor may set a steering allowable angle applicable to the vehicle by the autonomous driving module. The at least one processor may identify the indication of abnormality of the autonomous driving module based on a steering command angle and the steering allowable angle applicable to the vehicle at a location of the vehicle.

In one implementation, the at least one processor may identify a steering command angle applicable to the vehicle at a location of the vehicle from the received command data. The at least one processor may also identify a steering angle as an angle of the vehicle from the identified first measurement data. The at least one processor may further identify a curvature of a road where the vehicle is located from the map data. The at least one processor may identify the indication of abnormality of the autonomous driving module based on a (1_1)-th difference value as a difference between the road curvature and the steering command angle and a (1_2)-th difference value as a difference between the road curvature and the steering angle.

In one implementation, the at least one processor may set an allowable speed applicable to the vehicle by the autonomous driving module. The at least one processor may identify the indication of abnormality of the autonomous driving module based on a command speed and the allowable speed applicable to the vehicle at a location of the vehicle.

In one implementation, the at least one processor may identify a command speed applicable to the vehicle at a location of the vehicle from the received command data. The at least one processor may also identify a travel speed of the vehicle from the identified second measurement data. The at least one processor may further identify a speed limit of a road where the vehicle is located from the map data. The at least one processor may identify the indication of abnormality of the autonomous driving module based on a (2_1)-th difference value as a difference between the speed limit and the command speed and a (2_2)-th difference value as a difference between the speed limit and the travel speed.

In one implementation, the at least one processor may stop transmission of the command data to a gateway connected to controllers related to driving of the vehicle based on the indication of abnormality being identified in the autonomous driving module. The at least one processor may update an abnormality indication log of the autonomous driving module.

In one implementation, the at least one processor may identify the number of occurrences of the indication of abnormality of the autonomous driving module by referring to the abnormality indication log based on the abnormality indication log being updated. The at least one processor may generate a random number to determine a subsequent indication of abnormality of the autonomous driving module based on the identified number of occurrences and a predetermined number. The at least one processor may encrypt the random number based on a predetermined public key and transmit the generated encrypted random number to the autonomous driving module.

In one implementation, the at least one processor may receive a decrypted random number generated via a private key corresponding to the public key that has encrypted the random number from the autonomous driving module. The at least one processor may determine the transmission of the command data to the gateway of the vehicle based on comparison between the random number and the decrypted random number.

In one implementation, the at least one processor may determine connection of the autonomous driving module and the gateway based on the comparison between the random number and the decrypted random number.

In one implementation, the at least one processor may stop the transmission of the command data from the autonomous driving module to the gateway of the vehicle based on the random number and the decrypted random number being different from each other.

In one implementation, the at least one processor may allow the command data to be transmitted from the autonomous driving module to the gateway of the vehicle based on the random number being the same as the decrypted random number The at least one processor may stop, with a target time point if the abnormality indication log is updated as a reference, the transmission of the command data from the autonomous driving module to the gateway of the vehicle based on the indication of abnormality sign being identified in the autonomous driving module at a time point subsequent to the target time point.

In one implementation, the at least one processor may transmit a warning alarm corresponding to release of an autonomous driving mode or transfer of control rights of the vehicle to a user driving the vehicle based on the transmission of the command data from the autonomous driving module to the gateway of the vehicle being stopped.

In one implementation, the autonomous driving module may further include a third-party autonomous driving module that is not included in the vehicle. The third-party autonomous driving module may transmit the command data to the vehicle from outside the vehicle.

According to another aspect of the present disclosure, a method for identifying an indication of abnormality. The method includes receiving command data related to autonomous driving of a vehicle from an autonomous driving module. The method also includes identifying, based on the reception of the command data, at least one of i) first measurement data corresponding to a lateral direction based on a movement direction of the vehicle and related to a movement of the vehicle or ii) second measurement data corresponding to a longitudinal direction based on the movement direction of the vehicle and related to the movement of the vehicle. The method further includes identifying the indication of abnormality of the autonomous driving module based on at least one of map data including a high-definition map (HD map) received from a map device, the command data, the first measurement data, the second measurement data, or any combination thereof.

In one implementation, identifying the indication of abnormality may include setting a steering allowable angle applicable to the vehicle by the autonomous driving module. Identifying the indication of abnormality may also include identifying the indication of abnormality of the autonomous driving module based on a steering command angle and the steering allowable angle applicable to the vehicle at a location of the vehicle.

In one implementation, identifying the indication of abnormality may include identifying a steering command angle applicable to the vehicle at a location of the vehicle from the received command data. Identifying the indication of abnormality may also include identifying a steering angle as an angle of the vehicle from the identified first measurement data. Identifying the indication of abnormality may additionally include identifying a curvature of a road where the vehicle is located from the map data. Identifying the indication of abnormality may further include identifying the indication abnormality of the autonomous driving module based on a (1_1)-th difference value as a difference between the road curvature and the steering command angle and a (1_2)-th difference value as a difference between the road curvature and the steering angle.

In one implementation, identifying the indication of abnormality may include setting an allowable speed applicable to the vehicle by the autonomous driving module. Identifying the indication of abnormality may also include identifying the indication of abnormality of the autonomous driving module based on a command speed and the allowable speed applicable to the vehicle at a location of the vehicle.

In one implementation, identifying the indication of abnormality may include identifying a command speed applicable to the vehicle at a location of the vehicle from the received command data. Identifying the indication of abnormality may also include identifying a travel speed of the vehicle from the identified second measurement data. Identifying the indication of abnormality may additionally include identifying a speed limit of a road where the vehicle is located from the map data. Identifying the indication of abnormality may further include identifying the indication of abnormality of the autonomous driving module based on a (2_1)-th difference value as a difference between the speed limit and the command speed and a (2_2)-th difference value as a difference between the speed limit and the travel speed.

In one implementation, identifying the indication of abnormality may include stopping transmission of the command data to a gateway connected to controllers related to driving of the vehicle based on the indication of abnormality sign being identified in the autonomous driving module. Identifying the indication of abnormality may also include updating an abnormality indication log of the autonomous driving module. Identifying the indication of abnormality may further include identifying the number of occurrences of the indication of abnormality of the autonomous driving module by referring to the abnormality indication log based on the abnormality indication log being updated. Identifying the indication of abnormality may additionally include generating a random number to determine a subsequent indication of abnormality of the autonomous driving module based on the identified number of occurrences and a predetermined number. Identifying the indication of abnormality may further still include encrypting the random number based on a predetermined public key and transmitting the generated encrypted random number to the autonomous driving module.

In one implementation, identifying the indication of abnormality may include receiving a decrypted random number generated via a private key corresponding to the public key that has encrypted the random number from the autonomous driving module. Identifying the indication of abnormality may also include stopping the transmission of the command data from the autonomous driving module to the gateway of the vehicle based on the random number and the decrypted random number being different from each other. Identifying the indication of abnormality may additionally include allowing the command data to be transmitted from the autonomous driving module to the gateway of the vehicle based on the random number being the same as the decrypted random number. Identifying the indication of abnormality may further include stopping, with a target time point if the abnormality indication log is updated as a reference, the transmission of the command data from the autonomous driving module to the gateway of the vehicle based on the indication of abnormality being identified in the autonomous driving module at a time point subsequent to the target time point. Identifying the indication of abnormality may further include transmitting a warning alarm corresponding to release of an autonomous driving mode or transfer of control rights of the vehicle to a user driving the vehicle based on the transmission of the command data from the autonomous driving module to the gateway of the vehicle being stopped.

BRIEF DESCRIPTION OF THE DRAWINGS

The above and other objects, features, and advantages of the present disclosure should be more apparent from the following detailed description taken in conjunction with the accompanying drawings, in which.

In relation to a description of the drawings, the same or similar reference numerals may be used for the same or similar components.

DETAILED DESCRIPTION

Figure 1:
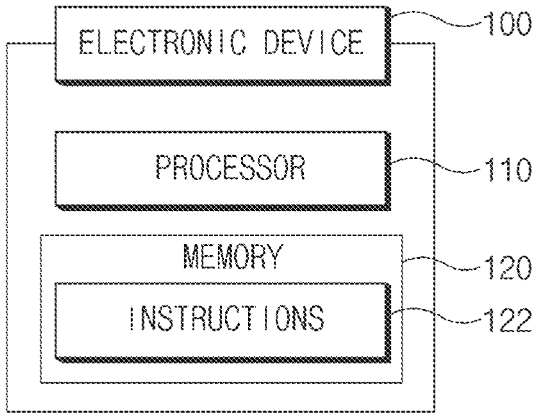
FIG. 1 is a diagram illustrating an electronic device, according to an embodiment of the present disclosure.

Hereinafter, embodiments of the present disclosure are described in detail with reference to the exemplary drawings. In adding the reference numerals to the components of the drawings, it should be noted that the identical or equivalent components are designated by the identical numeral even when the components are displayed on different drawings. Further, in describing the embodiment of the present disclosure, a detailed description of the related known configuration or function has been omitted where it was determined that the detailed description would interfere with the gist the present disclosure.

Various embodiments of the present disclosure are described with reference to the accompanying drawings. However, the present disclosure is not intended to limit the technology described herein to specific embodiments. Rather, the present disclosure should be understood to include various modifications, equivalents, and/or alternatives to the described embodiments. In connection with the description of the drawings, similar reference numerals may be used for similar components.

In describing the components of the embodiments according to the present disclosure, terms such as first, second, A, B, (a), (b), and the like may be used. These terms are merely intended to distinguish the components from other components. The terms do not limit the nature, order, or sequence of the components. Further, unless otherwise defined, all terms including technical and scientific terms used herein have the same meaning as commonly understood by one of ordinary skill in the art to which the present disclosure pertains. It should be further understood that terms, such as those defined in commonly used dictionaries, should be interpreted as having a meaning that is consistent with their meaning in the context of the relevant art. The terms should not be interpreted in an idealized or overly formal sense unless expressly so defined herein.

Expressions such as “first”, “second”, and the like used herein may modify various components regardless of order and/or importance. These terms are only used to distinguish one component from another component and do not limit the corresponding components. For example, a first user device and a second user device may represent different user devices regardless of the order or the importance. For example, a first component may be renamed a second component without departing from the scope of the present disclosure. Similarly, the second component may also be renamed the first component.

As used herein, expressions such as "have", "may have", "include", "may include", and the like refer to corresponding features (e.g., values, functions, operations, or components such as parts). Such expressions do not exclude the presence of additional features.

When one component (e.g., the first component) is referred to as being "(operatively or communicatively) coupled with/to" or "connected to" another component (e.g., the second component), it should be understood that the one component may be directly connected to the other component or may be connected thereto via a still another component (e.g., a third component). On the other hand, when one component (e.g., the first component) is referred to as being "directly connected to" or "directly coupled to" another component (e.g., the second component), it may be understood that no other component (e.g., the third component) exists between the component and the other component.

An expression "configured to" used in the present disclosure may be used interchangeably with, for example, "suitable for", "having the capacity to", "designed to", "adapted to", "made to", or "capable of", depending on a situation.

The term "configured (or set) to" may not necessarily mean "specifically designed to" in hardware. Instead, in some situations, an expression "device configured to ~" may mean that the device is "capable of ~" with other devices or components. For example, a phrase "processor configured (or set) to perform A, B, and C" may refer to a dedicated processor (e.g., an embedded processor) to perform the corresponding operations, or a generic-purpose processor (e.g., a CPU or an application processor) that may perform the corresponding operations by executing one or more software programs stored on a memory device.

When a component, device, element, or the like of the present disclosure is described as having a purpose or performing an operation, function, or the like, the component, device, or element should be considered herein as being "configured to" meet that purpose or perform that operation or function.

Terms used in the present disclosure are only used to describe specific embodiments. The terms are not intended to limit the scope of other embodiments. Singular expressions may include plural expressions unless the context clearly indicates otherwise. Terms used herein, including technical or scientific terms, have the same meaning as commonly understood by a person of ordinary skill in the art to which the present disclosure pertains. Among the terms used in the present disclosure, terms defined in general dictionaries may be interpreted to have the same or similar meanings as the meanings they have in the context of related technology. Unless clearly defined in the present disclosure, the terms should not be interpreted as having ideal or excessively formal meanings. In some cases, even the terms defined in the present document are not able to be interpreted to exclude embodiments of the present document.

In the present disclosure, expressions such as "A or B", "at least one of A or/and B", or "one or more of A or/and B" may include all possible combinations of the items listed together. For example, "A or B", "at least one of A and B", or "at least one of A or B" may refer to all cases of (1) including at least one A, (2) including at least one B, or (3) including both at least one A and at least one B. Additionally, in describing the components of the embodiments of the present disclosure, each of phrases such as "A or B", "at least one of A and B", "at least one of A or B", "A, B, or C", "A, B, and C", "at least one of A, B, or C", and "at least one of A, B, or C, or any combination thereof" may include any one of the items listed together in the corresponding phrase, or any possible combination thereof. For example, the phrase such as "at least one of A, B, or C, or any combination thereof" may include A or B or C or a combination thereof such as AB or ABC.

Hereinafter, embodiments of the present disclosure are described in detail with reference to FIGS. 1-8.

FIG. 1 is a diagram illustrating an electronic device, according to an embodiment of the present disclosure.

An electronic device 100 according to one embodiment may include a processor 110 and a memory 120 including instructions 122. For example, the electronic device 100 may represent a device that identifies an indication of abnormality of an autonomous driving module.

The electronic device 100 may prevent malfunction of a vehicle performing autonomous driving by stopping receiving command data from the autonomous driving module based on the identification of the indication of abnormality of the autonomous driving module. For example, the command data may include data necessary for the vehicle to perform autonomous driving. The command data may be generated by the autonomous driving module or may be generated by a server. The electronic device 100 may determine whether to receive the command data required to perform the autonomous driving from an external device. Specifically, if the external device is the autonomous driving module, the electronic device 100 may determine whether to receive the command data by identifying the indication of abnormality of the autonomous driving module.

The autonomous driving module may be a module mounted in the vehicle by a vehicle manufacturer at a time of shipment of the vehicle. However, the autonomous driving module is not limited thereto. For example, the autonomous driving module may be a module that is connected to the vehicle by a third party other than the vehicle manufacturer after the shipment of the vehicle. The autonomous driving module connected to the vehicle by the third party other than the vehicle manufacturer may be hacked from the outside or safety thereof may not be verified. Therefore, the autonomous driving module connected to the vehicle by the third party other than the vehicle manufacturer may need to be continuously checked whether the indication of abnormality has occurred.

Herein, the autonomous driving module for which the electronic device 100 identifies the indication of abnormality is mainly described as being an autonomous driving module connected to the vehicle by the third party other than the vehicle manufacturer. Additionally, herein, for convenience of description, the autonomous driving module connected to the vehicle by the third party other than the vehicle manufacturer is mainly described as being a third-party autonomous driving module. For example, the autonomous driving module may be a module manufactured, generated, or acquired by the vehicle manufacturer. The third-party autonomous driving module may be a module manufactured, generated, or acquired by the third party other than the vehicle manufacturer. Additionally, the third-party autonomous driving module, described in more detail below, may include an autonomous driving module that is a module manufactured, generated, or acquired by the vehicle manufacturer.

A detailed method of identifying, by the electronic device 100, the indication of abnormality of the third-party autonomous driving module, according to an embodiment, is described in more detail below with reference to FIG. 3.

The processor 110 may execute software and control at least one other component (e.g., a hardware or software component) connected to the processor 110. The processor 110 may also perform various data processing or operations. For example, the processor 110 may store the command data, first measurement data, second measurement data, and map data in the memory 120.

For reference, the processor 110 may perform all operations performed by the electronic device 100. Therefore, for convenience of description, herein, operations performed by the electronic device 100 are mainly described as being operations performed by the processor 110. Additionally, herein, for convenience of description, the processor 110 is mainly described as a single processor. However, the preset disclosure is not limited thereto. For example, the electronic device 100 may include at least one processor. Each of the at least one processor may perform all operations related to the identification of the indication of abnormality of the third-party autonomous driving module.

The memory 120 may temporarily and/or permanently store various data and/or information required to identify the indication of abnormality of the third-party autonomous driving module. For example, the memory 120 may store the command data, the first measurement data, the second measurement data, and the map data.

Figure 2:
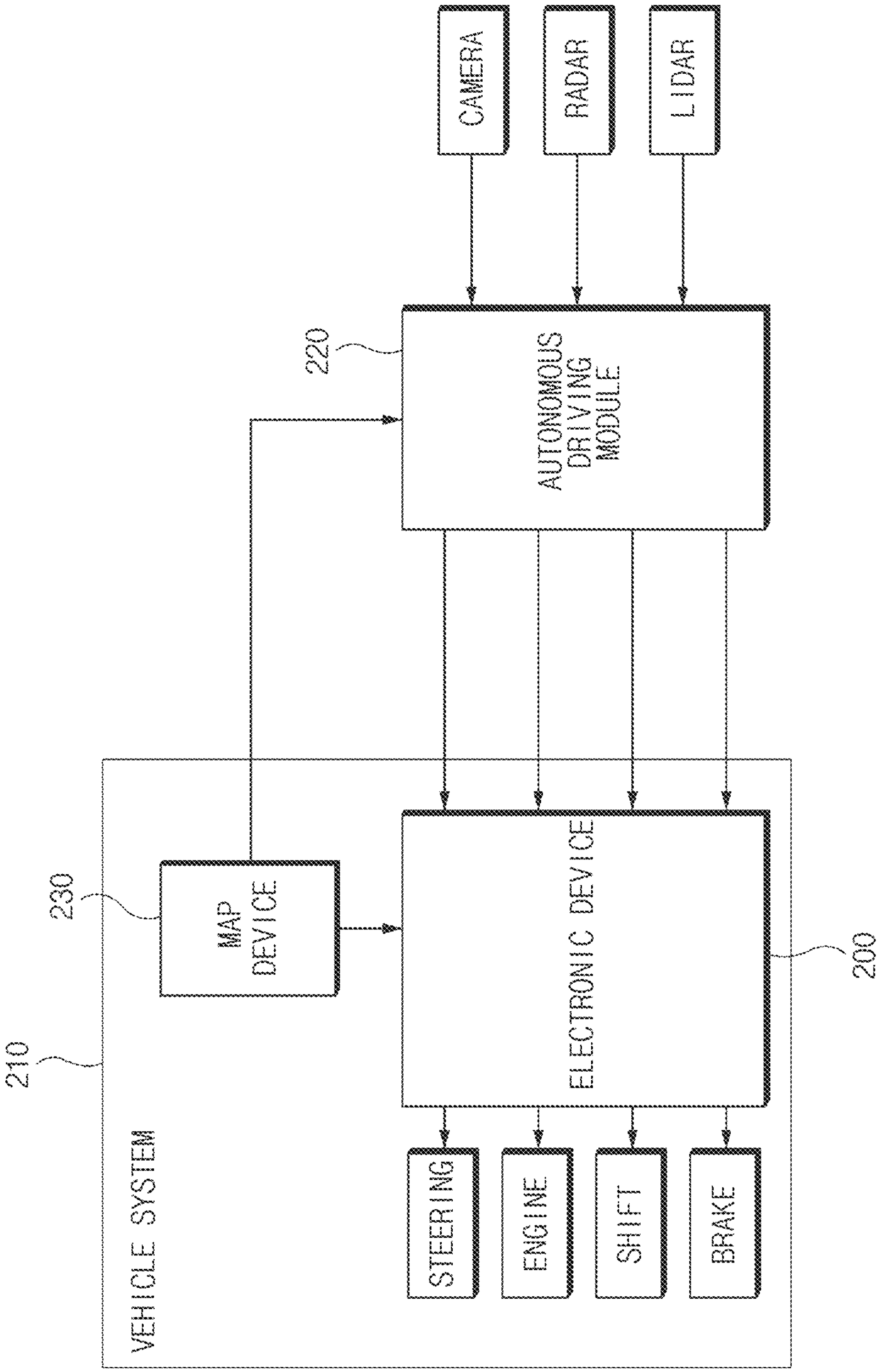
FIG. 2 is a diagram illustrating connection of a vehicle system and a third-party autonomous driving module in an electronic device, according to an embodiment of the present disclosure.

FIG. 2 is a diagram illustrating connection of a vehicle system and a third-party autonomous driving module in an electronic device, according to an embodiment of the present disclosure.

An electronic device 200 according to one embodiment may be included in a vehicle system 210. For example, the electronic device 200 may include a module that determines the indication of abnormality and a gateway connected to controllers related to driving of the vehicle. The controllers related to the driving of the vehicle may include a steering controller, an engine controller, a transmission controller, and a brake controller.

The electronic device 200 may be connected to a third-party autonomous driving module 220. In an example, the module that determines the indication of abnormality may be connected to the third-party autonomous driving module 220. Additionally, the gateway may be connected to the third-party autonomous driving module 220. The electronic device 200 may receive the command data related to the autonomous driving of the vehicle from the third-party autonomous driving module 220.

The third-party autonomous driving module 220 may be connected to the vehicle system 210. More specifically, the third-party autonomous driving module 220 may be connected to the electronic device 200 included in the vehicle system 210. The third-party autonomous driving module 220 may generate the command data related to the autonomous driving of the vehicle based on data identified from a camera, a radar, and a lidar.

A map device 230 may be a device that generates or transmits a high-definition map (HD Map). The electronic device 200 may identify the indication of abnormality of the third-party autonomous driving module based on the command data received from the third-party autonomous driving module 220 and the map data received from the map device 230.

Figure 3:
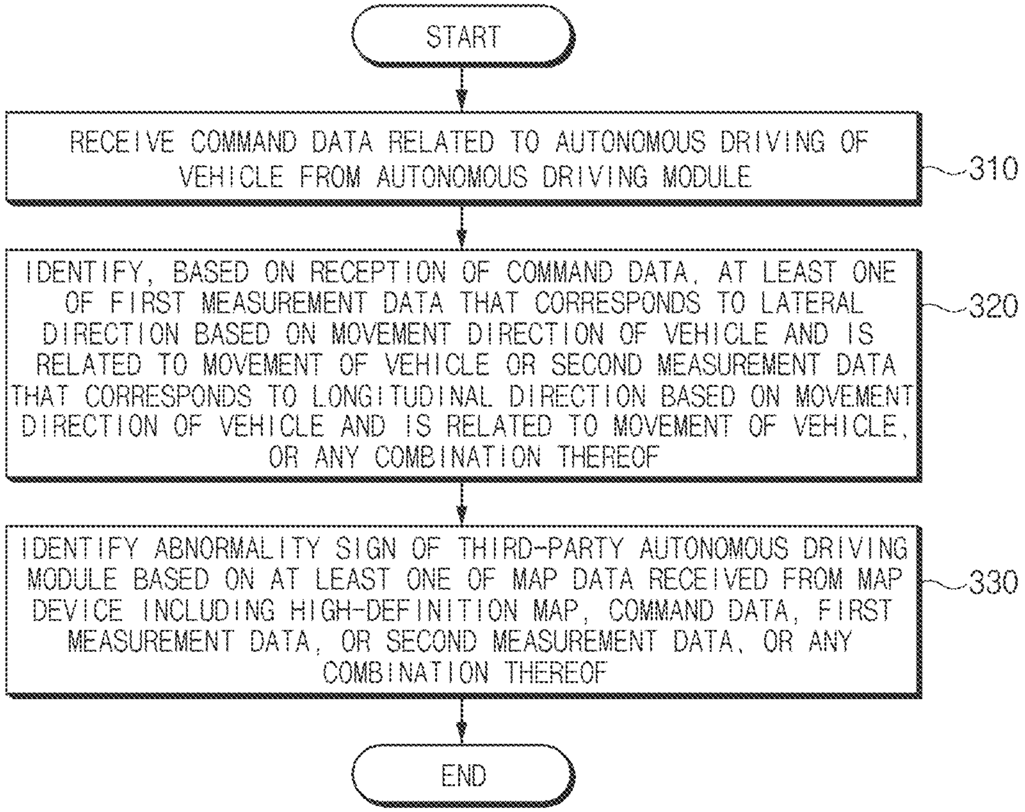
FIG. 3 is a flowchart illustrating a method for identifying an indication of abnormality of a third-party autonomous driving module by an electronic device, according to an embodiment of the present disclosure.

FIG. 3 is a flowchart illustrating a method for identifying an: abnormality of a third-party autonomous driving module by an electronic device, according to an embodiment of the present disclosure.

In an operation 310, an electronic device (e.g., the electronic device 100 in FIG. 1) according to one embodiment may receive command data related to autonomous driving of the vehicle from the third-party autonomous driving module. For example, the command data may include data related to forward collision-avoidance assist, lane keeping assist, blind-spot collision-avoidance assist, speed intelligent limit assist, driver attention warning, smart cruise control, navigation-based smart cruise control, lane following assist, highway driving assist, and highway driving assist 2.

The data related to the forward collision-avoidance assist may include data related to deceleration or steering for safety of the vehicle if a vehicle preceding the vehicle suddenly decelerates or stops. The data related to the lane keeping assist may include data that helps the traveling vehicle stay in a lane thereof. The data related to the blind-spot collision-avoidance assist may include data for controlling the vehicle if there is a vehicle following the vehicle in the rear while the vehicle is changing lanes and while a turn signal is turned on. The data related to the intelligent speed limit assist may include data for controlling the vehicle so as not to exceed a speed limit of a road while traveling. The data related to the driver attention warning may include data for analyzing a pattern of a driver and sending a warning depending on a careful driving state of the driver. The data related to the smart cruise control may include data for controlling the vehicle to travel at a speed set by the driver while maintaining a distance from the vehicle preceding the vehicle. The data related to the navigation-based smart cruise control may include data for controlling the vehicle based on a map input to a navigation system on the road such as a highway. The data related to the lane following assist may include data for controlling the traveling vehicle so as to travel while staying at a center of the lane. The data related to the highway driving assist may include data for controlling the vehicle to travel while maintaining the distance from the vehicle preceding the vehicle and staying at the center of the lane at the speed set by the driver. The data related to the highway driving assist 2 may include data for biased travel within the lane to prevent a collision with a nearby vehicle of the vehicle if the nearby vehicle gets closer.

As such, the command data may include various data that controls the vehicle for the autonomous driving of the vehicle. Therefore, herein, the operations of identifying the indication of abnormality of the third-party autonomous driving module are described in the context of the above-described data as an example.

In an operation 320, the electronic device may identify, based on the reception of the command data, at least one of i) first measurement data that corresponds to a lateral direction based on a movement direction of the vehicle and is related to the movement of the vehicle or ii) second measurement data that corresponds to a longitudinal direction based on the movement direction of the vehicle and is related to the movement of the vehicle, or any combination thereof.

The first measurement data may include data related to the steering of the vehicle. Specifically, the first measurement data may include a steering angle, i.e., an angle of the vehicle. The steering angle may represent a steering angle of a front tire of the vehicle. For example, if the vehicle is going straight, the steering angle may be 0 degrees. As another example, if the vehicle is turning 30 degrees from a center of the road, the steering angle may be 30 degrees. However, the steering angle is not limited thereto. For example, the steering angle may represent an angle determined by combining the steering angle of the front tire with a steering angle of a rear tire of the vehicle. For example, the steering angle may be an angle determined by adding the steering angle of the rear tire to the steering angle of the front tire of the vehicle. An operation of identifying, by the electronic device, the indication of abnormality of the third-party autonomous driving module based on the first measurement data, according to an embodiment, is described in more detail below with reference to FIG. 4.

The second measurement data may include data related to acceleration and the deceleration of the vehicle. For example, the second measurement data may include a travel speed of the vehicle. The travel speed may be calculated by a rotational speed of the tires of the vehicle. However, the travel speed is not limited thereto. For example, the travel speed may represent a GPS speed measured by a global positioning system (GPS) receiver mounted on the vehicle.

In an operation 330, the electronic device may identify the indication of abnormality of the third-party autonomous driving module based on at least one of the map data received from the map device including the high-definition map (the HD map), the command data, the first measurement data, the second measurement data, or any combination thereof.

For example, the electronic device may identify the indication of abnormality of the third-party autonomous driving module via comparison between a steering allowable angle and a steering command angle. As an example, the electronic device may identify the indication of abnormality of the third-party autonomous driving module via comparison between a road curvature identified from the map data, the steering angle, and the steering command angle. As yet another example, the electronic device may identify the indication of abnormality of the third-party autonomous driving module via comparison between an allowable speed and a command speed. For example, the electronic device may identify the indication of abnormality of the third-party autonomous driving module via comparison between the speed limit identified from the map data, the travel speed, and the command speed. A method of identifying the indication of abnormality of the third-party autonomous driving module, according to an embodiment, is described in more detail below with reference to FIGS. 4 and 5.

However, the method of identifying, by the electronic device, the indication of abnormality of the third-party autonomous driving module is not limited thereto. For example, the electronic device may apply at least one of the map data, the command data, the first measurement data, the second measurement data, or any combination thereof to an error identification model trained to identify the indication of abnormality of the autonomous driving module.

In an example, the electronic device may train the error identification model. By way of example, the error identification model may include a neural network. The neural network includes a plurality of layers, and each layer may include a plurality of nodes. The node may have a node value determined based on an activation function. A node in an arbitrary layer may be connected to a node (e.g., another node) in another layer via a link (e.g., a connection edge) with a connection weight. The node value of the node may be propagated to other nodes via the link. In an inference operation of the neural network, the node values may be forward-propagated in a direction from a previous layer to a next layer.

As an example, a forward propagation operation in the error identification model may represent an operation that propagates the node value based on input data in a direction from an input layer to an output layer of the error identification model. In other words, the node value of the corresponding node may be propagated (e.g., forward-propagated) to a node (e.g., a next node) of the next layer that is connected to the node via the connection edge. For example, the node may receive a value weighted by the connection weight from a previous node (e.g., a plurality of nodes) connected via the connection edge.

The trained error identification model may be a model trained via machine learning. For example, the trained error identification model may be a trained machine learning model (e.g., the trained error identification model) that outputs a training output (whether the indication of abnormality of the autonomous driving module has been identified) from a training input (e.g., the map data, the command data, the first measurement data, and the second measurement data). The machine learning model (e.g., the trained error identification model) may be generated via the machine learning. Learning algorithms may include, for example, supervised learning, unsupervised learning, semi-supervised learning, or reinforcement learning. However, the learning algorithm is not be limited to the above-described examples.

The machine learning model may include a plurality of artificial neural network layers. The artificial neural network may be a deep neural network (DNN), a convolutional neural network (CNN), a U-net for image segmentation (U-net), a recurrent neural network (RNN), a restricted Boltzmann machine (RBM), a deep belief network (DBN), a bidirectional recurrent deep neural network (BRDNN), a deep Q-network, or at least one of combinations thereof. However, the machine learning model is not limited to the above-described examples.

During the training process of the error identification model, parameters (e.g., the connection weight between the nodes/layers in the neural network) of the error identification model may be updated based on a loss. Such training may be performed on the electronic device itself where the machine learning model is performed or may also be performed via a separate server. The error identification model that has been trained may be stored in a memory (e.g., the memory 120 in FIG. 1).

Figure 4:
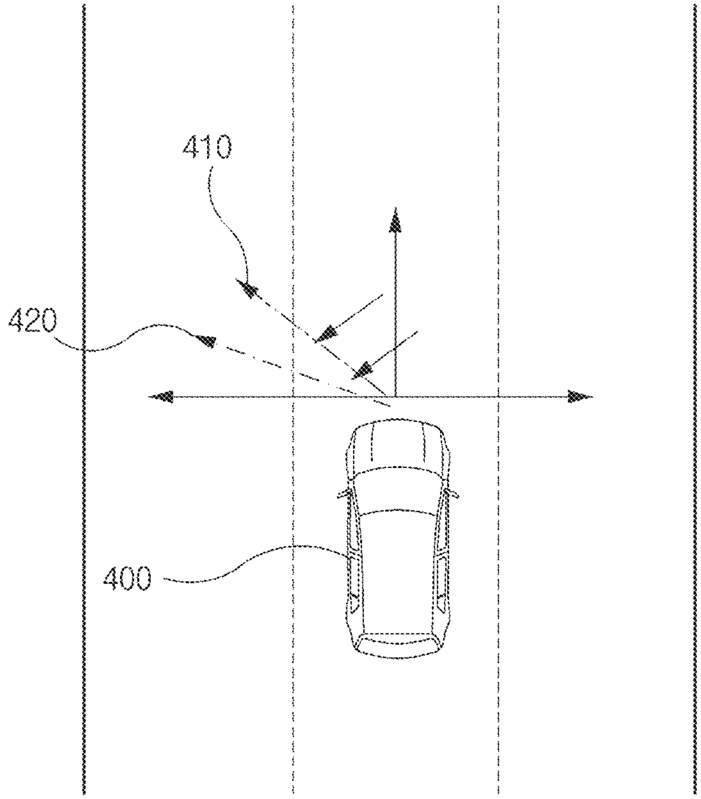
FIG. 4 is a diagram illustrating a method for identifying an indication of abnormality of a third-party autonomous driving module based on first measurement data by an electronic device, according to an embodiment of the present disclosure.

FIG. 4 is a diagram illustrating a method for identifying an indication of abnormality of a third-party autonomous driving module based on first measurement data by an electronic device, according to an embodiment of the present disclosure.

An electronic device (e.g., the electronic device 100 in FIG. 1) according to one embodiment may identify the indication of abnormality of the third-party autonomous driving module via a steering angle of a vehicle 400. For example, the electronic device may set a steering allowable angle 410 that the third-party autonomous driving module may apply to the vehicle 400. The electronic device may identify the indication of abnormality of the third-party autonomous driving module based on comparison between a steering command angle 420 and the steering allowable angle 410 that may be applied to the vehicle 400 at a location of the vehicle 400. For example, the electronic device may determine that the indication of abnormality has occurred in the third-party autonomous driving module if the steering command angle 420 exceeds the steering allowable angle 410.

However, the method for identifying the indication of abnormality of the third-party autonomous driving module based on the first measurement data is not limited thereto. For example, the electronic device may identify, from the received command data, the steering command angle 420 that may be applied to the vehicle 400 at the location of the vehicle 400, The electronic device may then identify, from the identified first measurement data, the steering angle, i.e., an angle of the vehicle. Additionally, the electronic device may identify a curvature of a road on which the vehicle 400 is located from the map data.

The electronic device may identify the indication of abnormality of the third-party autonomous driving module based on a (1_1)-th difference value and a (1_2)-th difference value, where the (1_1)-th difference value is a difference between the road curvature and the steering command angle 420 and the (1_2)-th difference value is a difference between the road curvature and the steering angle. For example, the (1_1)-th difference value may include the difference between the road curvature and the steering command angle 420 and information on how much the vehicle 400 will turn by the command data. On the other hand, the (1_2)-th difference value may include the difference between the road curvature and the steering angle and information on how much the vehicle 400 is turning based on the current steering angle of the vehicle 400. The electronic device may determine that the indication of abnormality has occurred in the third-party autonomous driving module if the (1_1)-th difference value and the (1_2)-th difference value exceed a predetermined threshold value.

Figure 5:
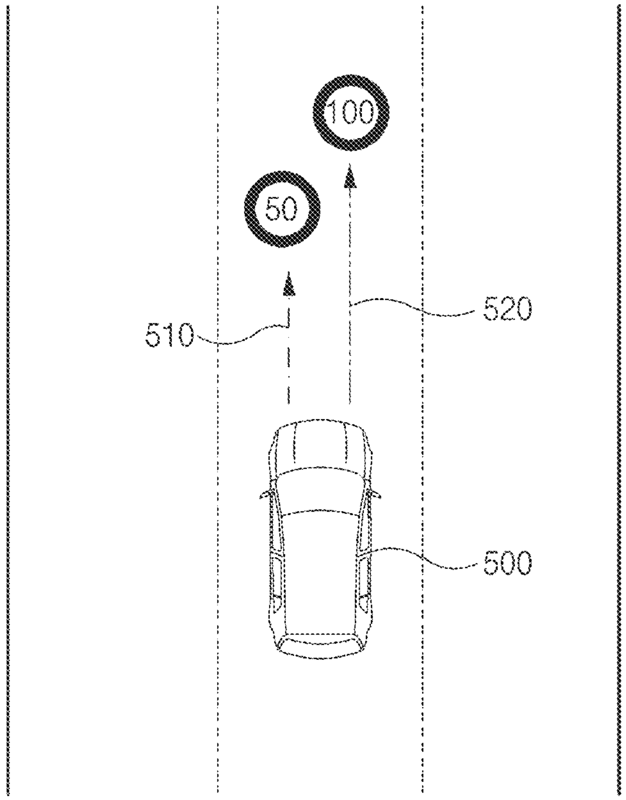
FIG. 5 is a diagram illustrating a method for identifying an indication of abnormality of a third-party autonomous driving module via second measurement data by an electronic device, according to one embodiment of the present disclosure.

FIG. 5 is a diagram illustrating a method for identifying an indication of abnormality of a third-party autonomous driving module based on second measurement data by an electronic device, according to one embodiment of the present disclosure.

An electronic device (e.g., the electronic device 100 in FIG. 1) according to one embodiment may identify the indication of abnormality of the third-party autonomous driving module based on a speed of a vehicle 500. For example, the electronic device may set an allowable speed 510 that the third-party autonomous driving module may apply to the vehicle 500. The electronic device may identify the indication of abnormality of the third-party autonomous driving module based on a command speed 520 and the allowable speed 510 that may be applied to the vehicle 500 at a location of the vehicle 500. For example, the electronic device may determine that the indication of abnormality has occurred in the third-party autonomous driving module if the command speed 520 exceeds the allowable speed 510.

However, the method for identifying the indication of abnormality of the third-party autonomous driving module based on the second measurement data is not limited thereto. For example, the electronic device may identify, from the received command data, the command speed 520 that may be applied to the vehicle 500 at the location of the vehicle 500. The electronic device may then identify, from the identified second measurement data, a travel speed of the vehicle. Additionally, the electronic device may identify a speed limit of a road on which the vehicle 500 is located from the map data.

The electronic device may identify the indication of abnormality of the third-party autonomous driving module based on a (2_1)-th difference value and a (2_2)-th difference value, where the (2_1)-th difference value is a difference between the speed limit and the command speed 520 and the (2_2)-th difference value is a difference between the speed limit and the travel speed. For example, the (2_1)-th difference value may include the difference between the speed limit and the command speed 520 and information on how much the vehicle 500 will accelerate by the command speed. On the other hand, the (2_2)-th difference value may include the difference between the speed limit and the travel speed and information on how much the vehicle 500 is accelerating or decelerating by the current travel speed of the vehicle 500. The electronic device may determine that the indication of abnormality has occurred in the third-party autonomous driving module if the (2_1)-th difference value and (2_2)-th difference value exceed a predetermined threshold value.

Figure 6:
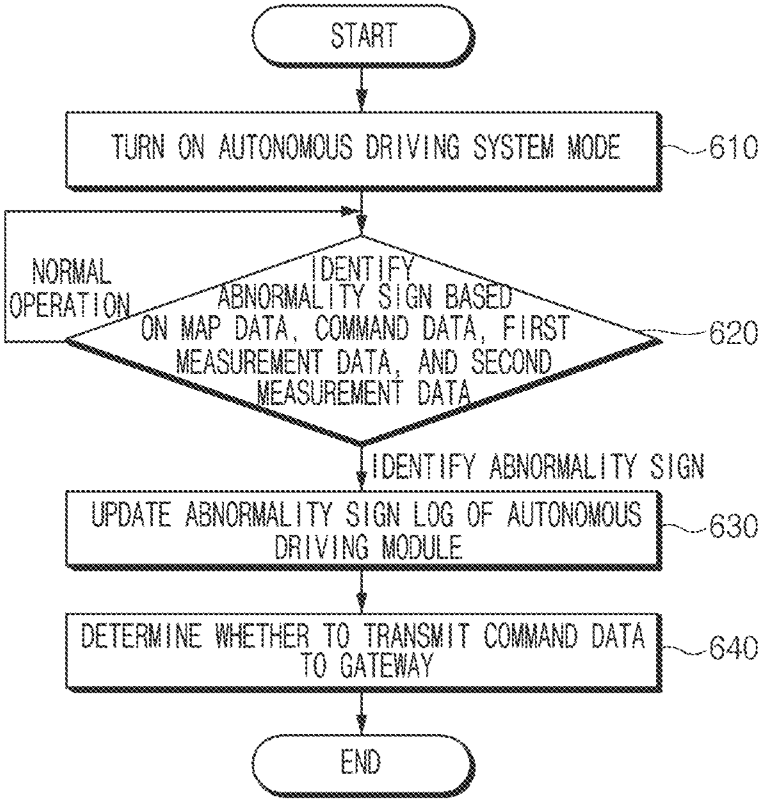
FIG. 6 is a flowchart illustrating a method for terminating an autonomous driving system mode if an indication of abnormality in a third-party autonomous driving module is identified by an electronic device, according to an embodiment of the present disclosure.

FIG. 6 is a flowchart illustrating a method for terminating an autonomous driving system mode if an indication of abnormality in a third-party autonomous driving module is identified by an electronic device, according to an embodiment of the present disclosure.

An electronic device (e.g., the electronic device 100 in FIG. 1) according to one embodiment may activate (turn on) an autonomous driving system mode in an operation 610. For example, the electronic device may activate the autonomous driving system mode included in the vehicle if the vehicle is able to perform the autonomous driving. The electronic device may connect the vehicle with the third-party autonomous driving module, based on the autonomous driving system mode of the vehicle being activated. For example, the electronic device may transmit the command data received from the third-party autonomous driving module to the vehicle.

In an operation 620, the electronic device may identify the indication of abnormality of the third-party autonomous driving module based on the map data, the command data, the first measurement data, and the second measurement data. A detailed description related thereto, according to embodiments, is provided above with reference to FIGS. 1-5. Therefore, the detailed description has been omitted from the description of FIG. 6. In an operation 620, if the indication of abnormality in the third-party autonomous driving module is not identified, the electronic device may repeatedly attempt to identify the indication of abnormality of the third-party autonomous driving module based on the above-described data. On the other hand, the electronic device may perform following operations if the indication of abnormality in the third-party autonomous driving module is identified in the operation 620.

In an operation 630, the electronic device may update an abnormality indication log of the third-party autonomous driving module based on the indication of abnormality being identified in the third-party autonomous driving module. In an example, the electronic device may stop transmission of the command data to the gateway connected to the controllers related to the driving of the vehicle before updating the abnormality indication log. Accordingly, the electronic device may resolve a fallback situation of the autonomous vehicle by stopping the command data from being transmitted to the gateway if the third-party autonomous driving module is hacked or a mechanical failure occurs.

In an operation 640, the electronic device may determine whether to transmit the command data to the gateway. A detailed description related thereto, according to an embodiment, is provided below with reference to FIG. 7.

Figure 7:
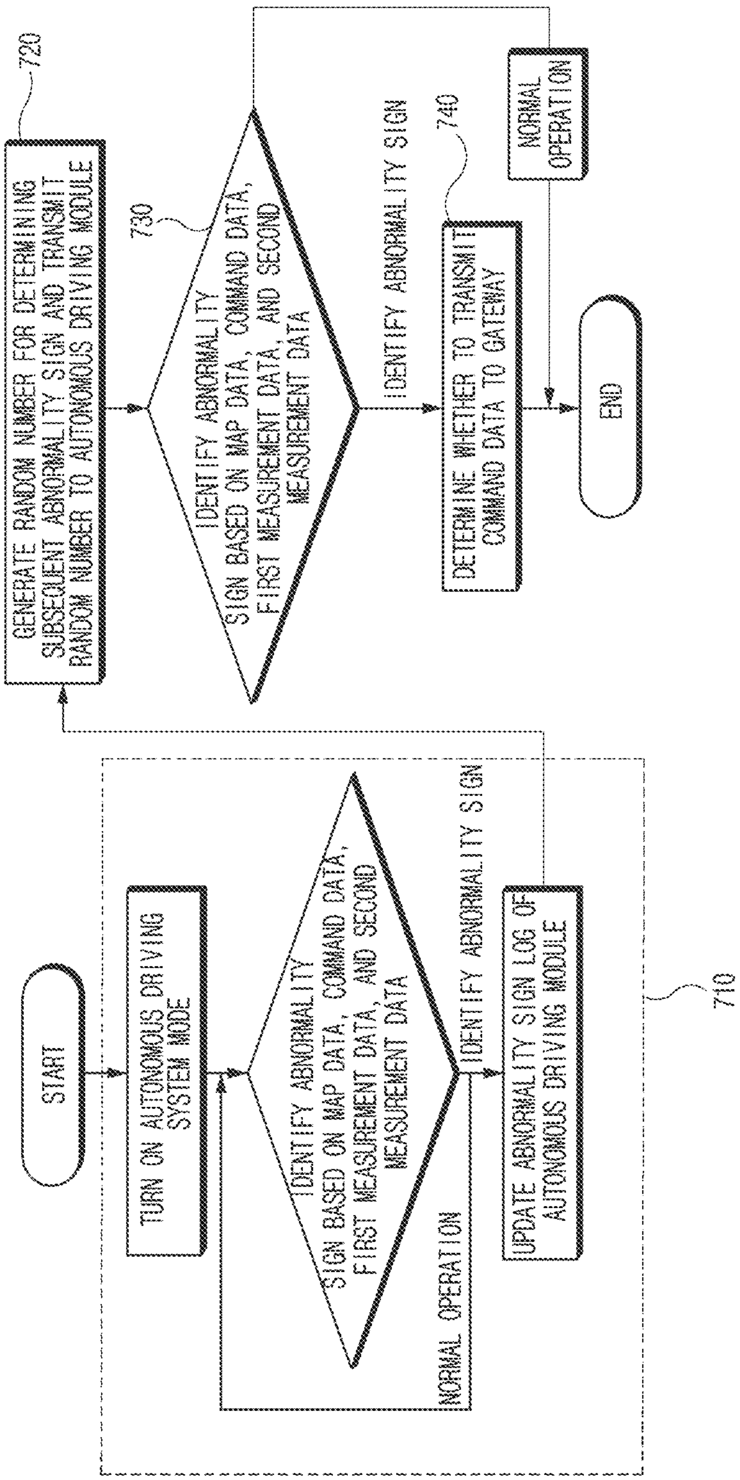
FIG. 7 is a flowchart illustrating a method for terminating an autonomous driving system mode if an indication of abnormality is identified at least twice in a third-party autonomous driving module by an electronic device, according to an embodiment of the present disclosure.

FIG. 7 is a flowchart illustrating a method for terminating an autonomous driving system mode if an indication of abnormality is identified at least twice in a third-party autonomous driving module by an electronic device, according to an embodiment of the present disclosure.

In an operation 710, an electronic device (e.g., the electronic device 100 in FIG. 1) according to one embodiment may update the abnormality indication log based on the indication of abnormality being identified in the third-party autonomous driving module. A detailed description related thereto, according to an embodiment, may be the same as operations 610 to 630 described above with reference to FIG. 6.

In an operation 720, the electronic device may generate a random number for determining a subsequent indication of abnormality. The electronic device may then transmit the random number to the third-party autonomous driving module. In an example, the electronic device may identify the number of occurrences of the indication of abnormality of the third-party autonomous driving module by referring to the abnormality indication log, based on the abnormality indication log being updated. In other words, a time point at which the electronic device identifies the number of occurrences of the indication of abnormality may be after a time point at which the abnormality occurs in the third-party autonomous driving module.

The electronic device may generate the random number to determine the subsequent indication of abnormality of the third-party autonomous driving module, based on the identified number f occurrences and a predetermined number. The subsequent indication of abnormality may represent those that occur after the indication of abnormality first occurs in the third-party autonomous driving module.

The electronic device may encrypt the random number based on a predetermined public key and transmit the generated encrypted random number to the third-party autonomous driving module. The electronic device may receive, from the third-party autonomous driving module, a decrypted random number generated via a private key corresponding to the public key with which the random number is encrypted. The electronic device may determine the transmission of the command data to the gateway of the vehicle, based on comparison between the random number and the decrypted random number. In an example, the operation of transmitting the encrypted random number to the third-party autonomous driving module by the electronic device may be the same as an operation of transmitting a question to the third-party autonomous driving module. In addition, the operation of comparing the random number with the decrypted random number by the electronic device may be the same as an operation of determining whether an answer received from the third-party autonomous driving module corresponds to the above-mentioned question. The electronic device may determine or identify the subsequent indication of abnormality of the third-party autonomous driving module via a series of question and answer pairs.

The electronic device may determine the connection of the third-party autonomous driving module and the gateway based on the comparison between the random number and the decrypted random number. In an example, the electronic device may stop the transmission of the command data from the third-party autonomous driving module to the gateway of the vehicle, based on the random number being different from the decrypted random number. On the other hand, the electronic device may allow the command data to be transmitted from the third-party autonomous driving module to the gateway of the vehicle, based on the random number being the same as the decrypted random number.

In an operation 730, the electronic device may identify the indication of abnormality of the third-party autonomous driving module based on the map data, the command data, the first measurement data, and the second measurement data. A detailed description related thereto, according to embodiments, is provided above with reference to FIGS. 1-5. Therefore, the detailed description has been omitted from the description of FIG. 7. In an operation 730, if the indication of abnormality in the third-party autonomous driving module is not identified, the electronic device may repeatedly attempt to identify the indication of abnormality of the third-party autonomous driving module based on the above-described data. On the other hand, the electronic device may perform following operations if the indication of abnormality in the third-party autonomous driving module is identified in the operation 730.

In an operation 740, the electronic device may determine whether to transmit the command data to the gateway. For example, based on a target time point at which the abnormality indication log is updated, the electronic device may stop the transmission of the command data from the third-party autonomous driving module to the gateway of the vehicle, based on the indication of abnormality being identified in the third-party autonomous driving module at a time point subsequent to the target time point. The electronic device may transmit a warning alarm corresponding to a release of an autonomous driving mode or a transfer of control rights of the vehicle to the user driving the vehicle, based on the transmission of the command data from the third-party autonomous driving module to the gateway of the vehicle being stopped.

Figure 8:
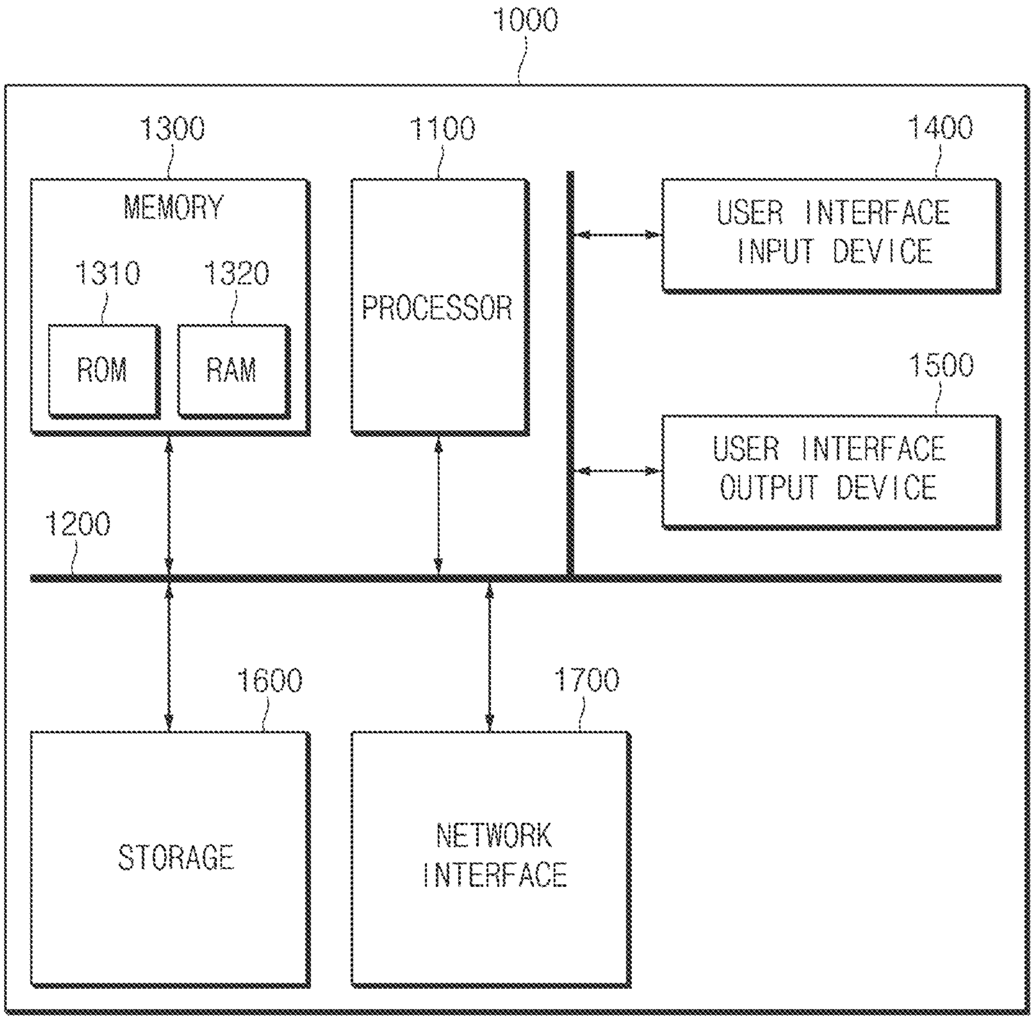
FIG. 8 is a diagram illustrating a computing system related to an electronic device or a method for identifying an indication of abnormality, according to an embodiment of the present disclosure.

FIG. 8 is a diagram illustrating a computing system related to an electronic device or a method for identifying an indication of abnormality, according to an embodiment of the With reference to FIG. 8, a computing system 1000 related to the electronic device or the method for identifying the indication of abnormality may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure. Various modifications and changes may be made by those having ordinary skill in the art without departing from the essential characteristics of the present disclosure.

The embodiments described above may be implemented with hardware components, software components, and/or a combination of the hardware components and the software components. For example, the device, the method, and the component described in the embodiments may be implemented using a general-purpose computer or a special-purpose computer, such as, for example, a processor, a controller, an arithmetic logic unit (ALU), a digital signal processor, a microcomputer, a field programmable gate array (FPGA), a programmable logic unit (PLU), a microprocessor, or any other device that may execute and respond to instructions. A processing device may execute an operating system (OS) and a software application running on the operating system. Additionally, the processing device may access, store, manipulate, process, and generate data in response to execution of software. For ease of understanding, the single processing device may be described to be used, but those skilled in the art will appreciate that the processing device may include a plurality of processing elements and/or a plurality of types of processing elements. For example, the processing device may include a plurality of processors or one processor and one controller. Additionally, other processing configurations, such as parallel processors, are possible.

The software may include a computer program, a code, an instruction, or one or more combinations thereof, and may configure the processing device to operate as desired or may independently or collectively instruct the processing device. The software and/or the data may be permanently or temporarily embodied in any type of machine, a component, a physical device, virtual equipment, a computer storage medium or device, or a transmitted signal wave to be interpreted by or to provide instructions or data to the processing device. The software may be distributed over networked computer systems and stored or executed in a distributed manner. The software and the data may be stored on a computer-readable recording medium.

The method according to embodiments may be implemented in a form of program instructions that may be executed via various computer means and recorded on a computer-readable medium. The computer-readable medium may include the program instruction, a data file, a data structure, and the like singly or in combination, and the program instruction recorded on the medium may be specially designed and configured for the embodiment or may be known and available to those skilled in the art of the computer software. Examples of the computer-readable recording media include magnetic media such as a hard disk, a floppy disk, and a magnetic tape, optical media such as a CD-ROM and a DVD, magneto-optical media such as a floptical disk, and hardware devices specifically configured to store and execute the program instructions such as a ROM, a RAM, and a flash memory. Examples of the program instructions include machine language code, such as that produced by a compiler, as well as high-level language code that may be executed by a computer using an interpreter or the like.

The hardware device described above may be configured to operate as one or a plurality of software modules to perform the operation of the embodiment, and vice versa.

Although the embodiments are described with limited drawings as described above, those having ordinary skill in the art may apply various technical modifications and variations based on the same. For example, even if the described technologies are performed in an order different from that in the described method, and/or components of the described system, structure, device, circuit, and the like are coupled or combined with each other in a form different from that in the described method, or are replaced with or substituted by equivalents, appropriate results may be achieved.

Therefore, other implementations, other embodiments, and equivalents of the claims also fall within the scope of the appended claims.

Therefore, the embodiments disclosed in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the electronic device and the abnormality indication identification method according to the present disclosure are described as follows.

According to at least one of the embodiments of the present disclosure, the indication of abnormality of the third-party autonomous driving module may be determined, and the possibility of malfunction of the vehicle may be reduced, by identifying command data received from the third-party autonomous driving module, a first measurement data corresponding to the longitudinal direction, and a second measurement data corresponding to the lateral direction.

Further, according to at least one of the embodiments of the present disclosure, the error in the command data of the third-party autonomous driving module may be determined, and the possibility of malfunction of the vehicle may be reduced, via a high-definition map required for autonomous driving of the vehicle by acquiring output data based on the map data related to the high-definition the command data, the first measurement data, and the second measurement data.

Further, according to at least one of the embodiments of the present disclosure, whether there is the error in the gateway as the internal system of the vehicle or the third-party autonomous driving module as the external system of the vehicle may be identified by transmitting and receiving the encrypted random number with the third-party autonomous driving module by referring to the abnormality indication log.

In addition, various effects that are directly or indirectly identified via the present document may be provided.

Hereinabove, although the present disclosure has been described with reference to certain embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

What is claimed is:

1. An electronic device comprising:

a memory configured to store computer-executable instructions; and at least one processor configured to access the memory and execute the computer-executable instructions, wherein the at least one processor is configured to:

receive command data related to autonomous driving of a vehicle from an autonomous driving module, identify, based on the reception of the command data, at least one of i) first measurement data corresponding to a lateral direction based on a movement direction of the vehicle and related to a movement of the vehicle or ii) second measurement data corresponding to a longitudinal direction based on the movement direction of the vehicle and related to the movement of the vehicle and identify an indication of abnormality of the autonomous driving module based on at least one of map data including a high-definition map (HD map) received from a map device, the command data, the first measurement data, or the second measurement data, stop transmission of the command data to a gateway connected to controllers related to driving of the vehicle based on the indication of abnormality being identified in the autonomous driving module, and update an abnormality indication log of the autonomous driving module.

2. The electronic device of claim 1, wherein the at least one processor is configured to:

set a steering allowable angle applicable to the vehicle by the autonomous driving module; and identify the indication of abnormality of the autonomous driving module based on a steering command angle and the steering allowable angle applicable to the vehicle at a location of the vehicle.

3. The electronic device of claim 1, wherein the at least one processor is configured to:

identify a steering command angle applicable to the vehicle at a location of the vehicle from the received command data;

identify a steering angle as an angle of the vehicle from the identified first measurement data;

identify a curvature of a road where the vehicle is located from the map data; and identify the indication of abnormality of the autonomous driving module based on a (1_1)-th difference value as a difference between the curvature of the road and the steering command angle and a (1_2)-th difference value as a difference between the curvature of the road and the steering angle.

4. The electronic device of claim 1, wherein the at least one processor is configured to:

set an allowable speed applicable to the vehicle by the autonomous driving module; and identify the indication of abnormality of the autonomous driving module based on a command speed and the allowable speed applicable to the vehicle at a location of the vehicle.

5. The electronic device of claim 1, wherein the at least one processor is configured to:

identify a command speed applicable to the vehicle at a location of the vehicle from the received command data;

identify a travel speed of the vehicle from the identified second measurement data;

identify a speed limit of a road where the vehicle is located from the map data; and identify the indication of abnormality of the autonomous driving module based on a (2_1)-th difference value as a difference between the speed limit and the command speed and a (2_2)-th difference value as a difference between the speed limit and the travel speed.

6. The electronic device of claim 1, wherein the at least one processor is configured to:

identify a number of occurrences of the indication of abnormality of the autonomous driving module by referring to the abnormality indication log based on the abnormality indication log being updated;

generate a random number to determine a subsequent indication of abnormality of the autonomous driving module based on the identified number of occurrences and a predetermined number; and encrypt the random number based on a predetermined public key and transmit the generated encrypted random number to the autonomous driving module.

7. The electronic device of claim 6, wherein the at least one processor is configured to:

receive a decrypted random number generated via a private key corresponding to a public key that has encrypted the random number from the autonomous driving module; and determine the transmission of the command data to the gateway of the vehicle based on comparison between the random number and the decrypted random number.

8. The electronic device of claim 7, wherein the at least one processor is configured to determine connection of the autonomous driving module and the gateway based on a comparison between the random number and the decrypted random number.

9. The electronic device of claim 7, wherein the at least one processor is configured to stop the transmission of the command data from the autonomous driving module to the gateway of the vehicle based on the random number and the decrypted random number being different from each other.

10. The electronic device of claim 7, wherein the at least one processor is configured to:

allow the command data to be transmitted from the autonomous driving module to the gateway of the vehicle based on the random number being same as the decrypted random number; and stop, with a target time point if the indication abnormality log is updated as a reference, the transmission of the command data from the autonomous driving module to the gateway of the vehicle based on the indication of abnormality being identified in the autonomous driving module at a time point subsequent to the target time point.

11. The electronic device of claim 7, wherein the at least one processor is configured to transmit a warning alarm corresponding to release of an autonomous driving mode or transfer of control rights of the vehicle to a user driving the vehicle based on the transmission of the command data from the autonomous driving module to the gateway of the vehicle being stopped.

12. The electronic device of claim 1, wherein the autonomous driving module further includes a third-party autonomous driving module not included in the vehicle and configured to transmit the command data to the vehicle from outside the vehicle.

13. A method for identifying an indication of abnormality, the method comprising:

receiving command data related to autonomous driving of a vehicle from an autonomous driving module;

identifying, based on the reception of the command data, at least one of i) first measurement data corresponding to a lateral direction based on a movement direction of the vehicle and related to a movement of the vehicle or ii) second measurement data corresponding to a longitudinal direction based on the movement direction of the vehicle and related to the movement of the vehicle, or both (i) and (ii);

identifying the indication of abnormality of the autonomous driving module based on at least one of map data including a high-definition map (HD map) received from a map device, the command data, the first measurement data, or the second measurement data;

stopping transmission of the command data to a gateway connected to controllers related to driving of the vehicle based on the indication of abnormality being identified in the autonomous driving module; and updating an abnormality indication log of the autonomous driving module.

14. The method of claim 13, wherein identifying the indication of abnormality includes:

setting a steering allowable angle applicable to the vehicle by the autonomous driving module; and identifying the indication of abnormality of the autonomous driving module based on a steering command angle and the steering allowable angle applicable to the vehicle at a location of the vehicle.

15. The method of claim 13, wherein identifying the indication of abnormality includes:

identifying a steering command angle applicable to the vehicle at a location of the vehicle from the received command data;

identifying a steering angle as an angle of the vehicle from the identified first measurement data;

identifying a curvature of a road where the vehicle is located from the map data; and identifying the indication of abnormality of the autonomous driving module based on a (1_1)-th difference value as a difference between the curvature of the road and the steering command angle and a (1_2)-th difference value as a difference between the curvature of the road and the steering angle.

16. The method of claim 13, wherein identifying the indication of abnormality includes:

setting an allowable speed applicable to the vehicle by the autonomous driving module; and identifying the indication of abnormality of the autonomous driving module based on a command speed and the allowable speed applicable to the vehicle at a location of the vehicle.

17. The method of claim 13, wherein identifying the indication of abnormality includes:

identifying a command speed applicable to the vehicle at a location of the vehicle from the received command data;

identifying a travel speed of the vehicle from the identified second measurement data;

identifying a speed limit of a road where the vehicle is located from the map data; and identifying the indication of abnormality of the autonomous driving module based on a (2_1)-th difference value as a difference between the speed limit and the command speed and a (2_2)-th difference value as a difference between the speed limit and the travel speed.

18. The method of claim 13, wherein identifying the indication of abnormality includes:

identifying a number of occurrences of the abnormality of the autonomous driving module by referring to the abnormality indication log based on the abnormality indication log being updated;

generating a random number to determine a subsequent indication of abnormality of the autonomous driving module based on the identified number of occurrences and a predetermined number; and encrypting the random number based on a predetermined public key and transmitting the generated encrypted random number to the autonomous driving module.

19. The method of claim 18, wherein identifying the indication of abnormality includes:

receiving a decrypted random number generated via a private key corresponding to a public key that has encrypted the random number from the autonomous driving module;

stopping the transmission of the command data from the autonomous driving module to the gateway of the vehicle based on the random number and the decrypted random number being different from each other;

allowing the command data to be transmitted from the autonomous driving module to the gateway of the vehicle based on the random number being same as the decrypted random number;

stopping, with a target time point if the abnormality indication log is updated as a reference, the transmission of the command data from the autonomous driving module to the gateway of the vehicle based on the indication of abnormality being identified in the autonomous driving module at a time point subsequent to the target time point; and transmitting a warning alarm corresponding to release of an autonomous driving mode or transfer of control rights of the vehicle to a user driving the vehicle based on the transmission of the command data from the autonomous driving module to the gateway of the vehicle being stopped.

* * * * *